(12) United States Patent
Flogaus et al.

(10) Patent No.: US 10,995,830 B2
(45) Date of Patent: May 4, 2021

(54) FURNITURE DRIVE

(71) Applicant: Julius Blum GmbH, Hoechst (AT)

(72) Inventors: Alexander Simon Flogaus, Eriskirch (DE); Franz Kohlweiss, Hard (AT)

(73) Assignee: Julius Blum GmbH, Hoechst (AT)

( * ) Notice: Subject to any disclaimer, the term of this patent is extended or adjusted under 35 U.S.C. 154(b) by 232 days.

(21) Appl. No.: 16/161,219

(22) Filed: Oct. 16, 2018

(65) Prior Publication Data

US 2019/0048981 A1 Feb. 14, 2019

Related U.S. Application Data

(63) Continuation of application No. PCT/AT2017/060045, filed on Feb. 24, 2017.

(30) Foreign Application Priority Data

Apr. 28, 2016 (AT) .............................. A 50380/2016

(51) Int. Cl.
*A47B 95/02* (2006.01)
*F16H 21/44* (2006.01)
(Continued)

(52) U.S. Cl.
CPC ............. *F16H 21/44* (2013.01); *A47B 51/00* (2013.01); *E05F 1/1075* (2013.01); *E05Y 2201/638* (2013.01); *E05Y 2900/20* (2013.01)

(58) Field of Classification Search
CPC .............. A47B 51/00; A47B 2051/005; E05Y 2900/20; E05Y 2201/638; E05F 1/1075; F16H 21/44
See application file for complete search history.

(56) References Cited

U.S. PATENT DOCUMENTS 7,240,974 B2 7/2007 Hirtsiefer
7,478,891 B2 1/2009 Hollenstein
(Continued)

FOREIGN PATENT DOCUMENTS

AT 515661 11/2015
CN 1918352 2/2007
(Continued)

OTHER PUBLICATIONS

International Search Report dated May 29, 2017 in International (PCT) Application No. PCT/AT2017/060045.
(Continued)

*Primary Examiner* — Matthew W Ing
(74) *Attorney, Agent, or Firm* — Wenderoth, Lind & Ponack, L.L.P.

(57) ABSTRACT

A furniture drive for a furniture part movably-supported relative to a furniture carcass, includes at least one pivotally mounted actuating arm for moving the movable furniture part, a spring device for applying a force to the actuating arm, and a transmission mechanism for transmitting a force from the spring device to the actuating arm. The transmission mechanism includes a first setting contour having a first torque progression and a pressure portion pressurized by the spring device. The pressure portion is configured to run along the first setting contour upon a movement of the actuating arm, and a second setting contour having a second torque progression deviating from the first torque progression and a switching device are provided. The second setting contour can be engaged with the pressure portion so that the pressure portion is configured to run along the second setting contour upon a movement of the actuating arm.

17 Claims, 10 Drawing Sheets

(51) Int. Cl.
  *E05F 1/10* (2006.01)
  *A47B 51/00* (2006.01)

(56) References Cited

U.S. PATENT DOCUMENTS

| | | | |
|---|---|---|---|
| 7,500,287 B2 | 3/2009 | Brustle | |
| 7,810,213 B2 | 10/2010 | Brustle | |
| 8,376,420 B2 | 2/2013 | Peterlunger | |
| 8,590,107 B2 | 11/2013 | Omann | |
| 9,085,925 B2 | 7/2015 | Steinhauser | |
| 9,523,228 B2 | 12/2016 | Krammer et al. | |
| 9,903,145 B2 | 2/2018 | Huber et al. | |
| 10,487,554 B2 | 11/2019 | Lubetz et al. | |
| 10,561,235 B1* | 2/2020 | Abbott | A47B 46/005 |
| 2004/0239213 A1* | 12/2004 | Hirtsiefer | E05F 1/1058 312/109 |
| 2006/0284530 A1 | 12/2006 | Hollenstein | |
| 2007/0124893 A1 | 6/2007 | Brustle | |
| 2008/0203738 A1 | 8/2008 | Peterlunger | |
| 2009/0064457 A1* | 3/2009 | Brustle | E05F 5/02 16/292 |
| 2011/0067964 A1 | 3/2011 | Krammer et al. | |
| 2011/0068669 A1* | 3/2011 | Hollenstein | E05D 15/40 312/319.1 |
| 2011/0138960 A1* | 6/2011 | Omann | E05F 1/1058 74/490.07 |
| 2011/0193458 A1* | 8/2011 | Omann | E05D 15/401 312/319.2 |
| 2014/0191632 A1 | 7/2014 | Steinhauser | |
| 2016/0376823 A1 | 12/2016 | Huber et al. | |
| 2017/0204645 A1* | 7/2017 | Lubetz | F16H 25/18 |
| 2019/0219324 A1* | 7/2019 | Kang | F25D 25/022 |

FOREIGN PATENT DOCUMENTS

| | | |
|---|---|---|
| CN | 102197187 | 9/2011 |
| DE | 39 30 609 | 3/1991 |
| EP | 1 296 011 | 3/2003 |
| JP | 04-138333 | 12/1992 |
| JP | 2001-061567 | 3/2001 |
| JP | 2009-529106 | 8/2009 |
| JP | 2011-524479 | 9/2011 |
| JP | 2011-244932 | 12/2011 |
| JP | 2014-530310 | 11/2014 |
| JP | 2017-536492 | 12/2017 |
| KR | 10-2011-0010728 | 2/2011 |
| WO | 2006/005086 | 1/2006 |
| WO | 2015/135007 | 9/2015 |

OTHER PUBLICATIONS

Notice of Allowance dated Mar. 25, 2020 in corresponding Korean Patent Application No. 10-2018-7030883.

Search Report dated Oct. 8, 2019 in corresponding Chinese Patent Application No. 201780025953.5.

* cited by examiner

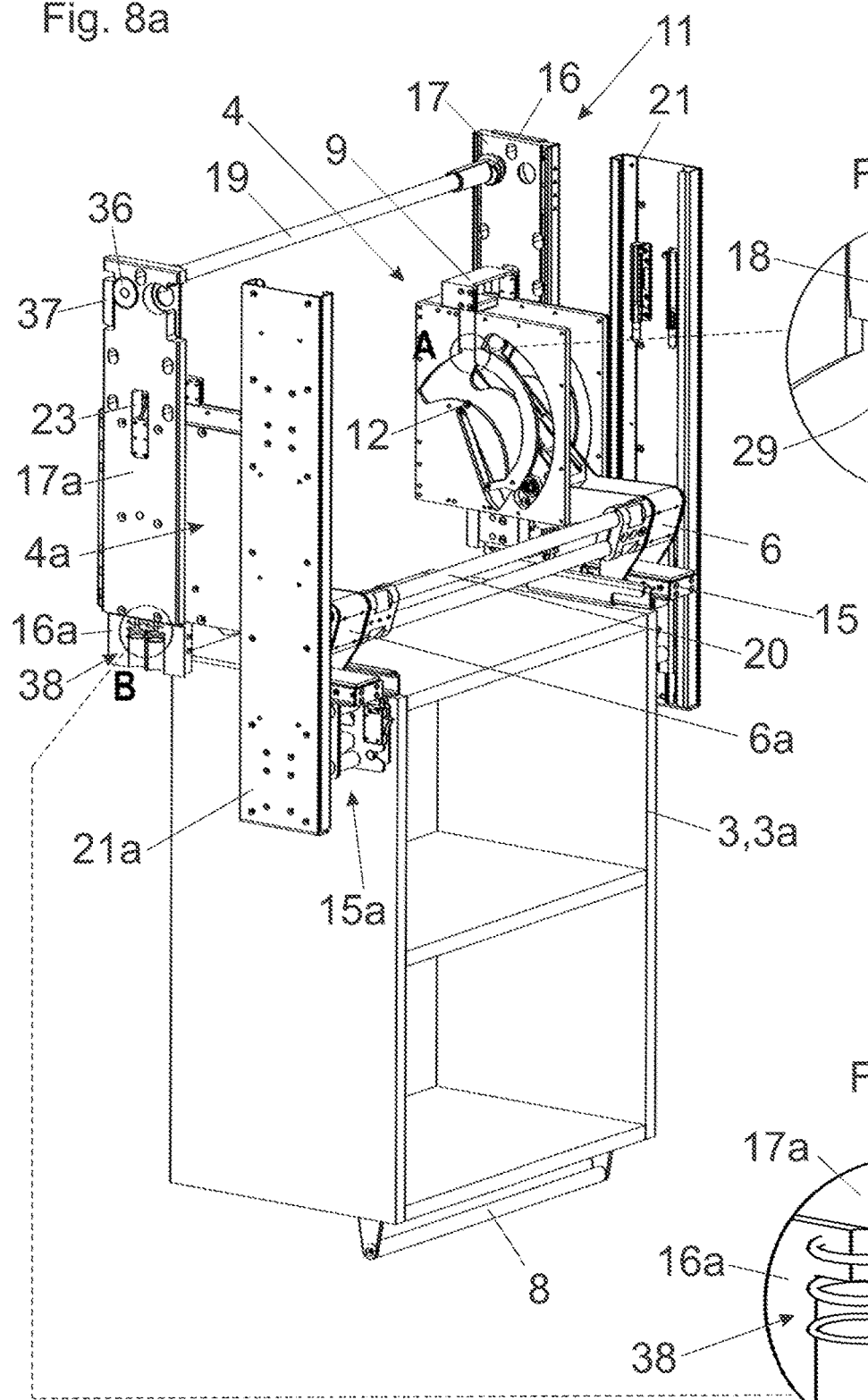
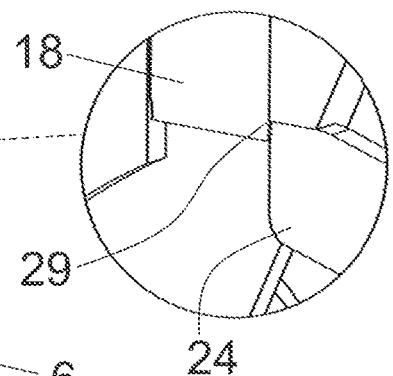
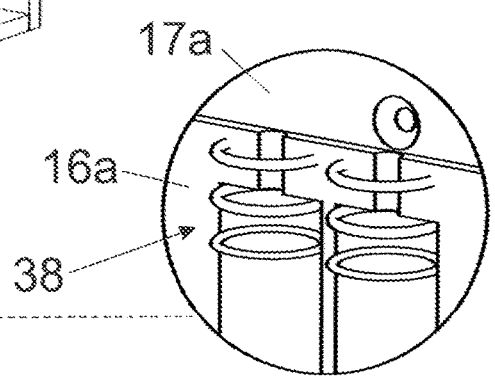

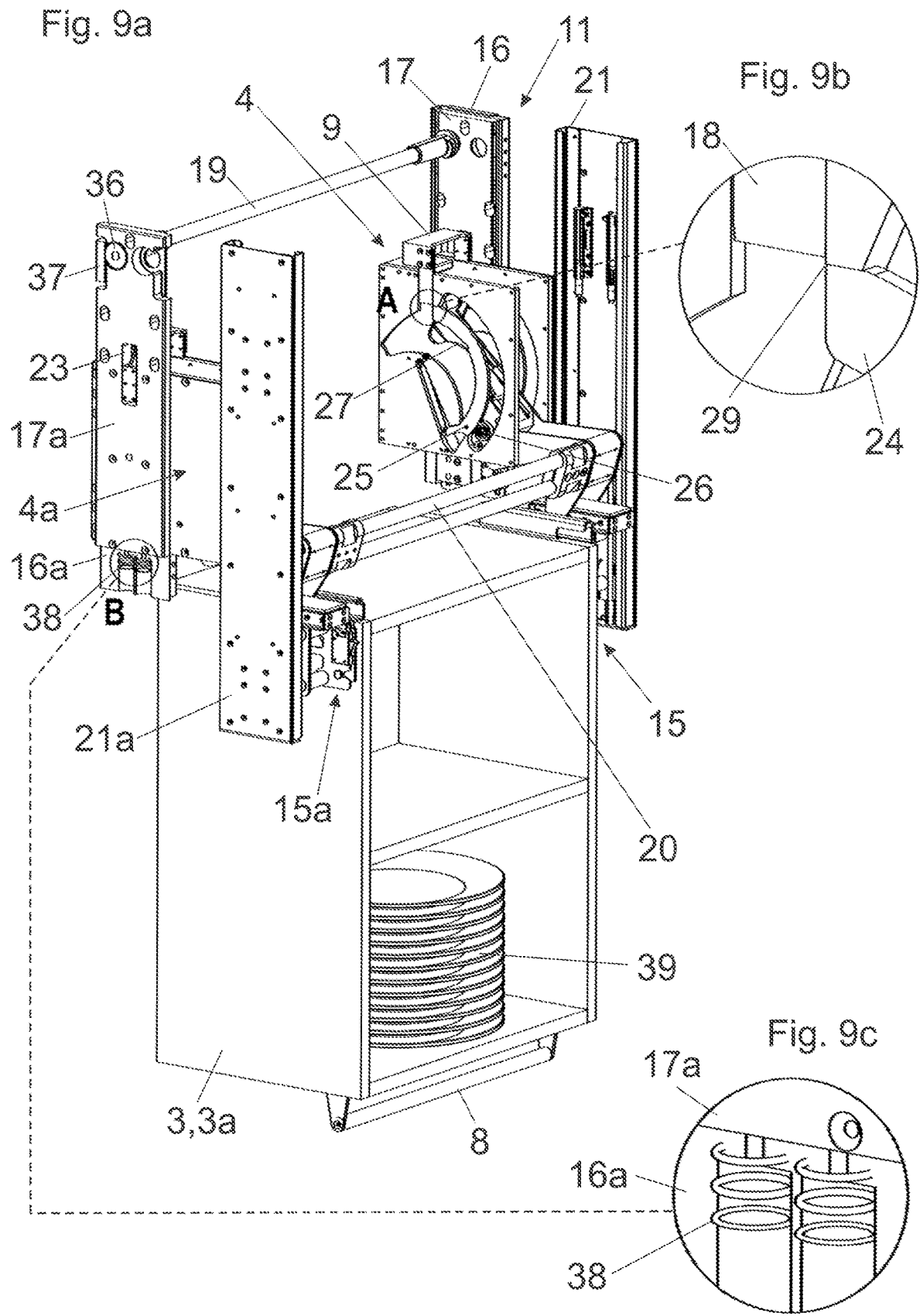

FURNITURE DRIVE

BACKGROUND OF THE INVENTION

The present invention relates to a furniture drive for a furniture part movably-supported relative to a furniture carcass, including:
- at least one pivotally mounted actuating arm for moving the movable furniture part,
- a spring device for applying a force to the actuating arm, and a transmission mechanism for transmitting a force from the spring device to the actuating arm. The transmission mechanism includes a first setting contour having a first torque progression and a pressure portion pressurized by the spring device, and the pressure portion is configured to run along the first setting contour upon a movement of the actuating arm.

The invention further concerns an arrangement with a furniture drive of the type to be described and with a supporting structure for mounting the furniture drive to a furniture carcass.

For example, a furniture drive of this type is already known from WO 2006/005086 A1.

A particular challenge when using such furniture drives lies in the fact that the torque of the spring device acting on the actuating arm is to be adapted to the specific weight and/or to different loading conditions of the movable furniture part. When that torque with respect to the weight and/or with respect to a loading condition of the furniture part is set too low, the movable furniture part is unable to be moved into an elevated end position relative to the furniture carcass. On the contrary, when the torque acting on the actuating arm is set too high, it is quite possible that the movable furniture part kicks upwardly into the elevated end position relative to a furniture carcass with an unduly large force.

SUMMARY OF THE INVENTION

It is an object of the present invention to propose a furniture drive of the type mentioned in the introductory part, in which an improved adaptation to different weights and/or to different loading conditions of the movable furniture part is possible.

According to the invention, at least one second setting contour having a second torque progression deviating from the first torque progression and a switching device are provided. The switching device allows the at least one second setting contour to be engaged with the pressure portion, so that the pressure portion is configured to run along the second setting contour upon a movement of the actuating arm.

The switching device, for example, can include at least one switch to be actuated manually or with the aid of a tool. By an actuation of the switch, at least one second setting contour having a torque progression deviating from the torque progression of the first setting contour can be engaged with the pressure portion. The switch can be configured as a mechanical switch and/or also as an electric switch, and the switch can be arranged on a housing of the furniture drive, on the furniture carcass or on the movable furniture part.

According to an embodiment, the furniture drive, in the mounting position, is movably supported relative to the furniture carcass to a limited extent in a height direction by at least one spring element, so that the movable furniture part having a first weight and/or having a first loading condition adopts a first height position relative to the furniture carcass. When the movable furniture part has a second weight being higher than the first weight and/or has a second loading condition being higher than the first loading condition, the movable furniture part adopts a second height position relative to the furniture carcass, wherein the second height position is lowered with respect to the first height position. Thereby, the switching device can be triggered, preferably automatically, in the second height position, so that the pressure portion is configured to run along the second setting contour upon a movement of the actuating arm.

Accordingly, the furniture drive can be movably supported relative to the furniture carcass in a height direction by the at least one spring element, and the spring element can by variably compressed or expanded by a different weight of the movable furniture part and/or by a different loading condition of the movable furniture part. The switching device can be released, preferably automatically, when the spring element exceeds a predetermined compression condition or a predetermined expanding condition, and the pressure portion is configured to run along the second setting contour upon a movement of the actuating arm.

According to an embodiment, the switch of the switching device has a first position and a second position. The first setting contour can be locked in the first position of the switch, and can be unlocked in the second position of the switch. The at least one switch can be arranged so as to be movably-mounted relative to a housing of the furniture drive.

According to an embodiment, the region of the second setting contour, which comes into contact with the pressure portion upon a movement of the actuating arm, has a reduced radial spacing in relation to the pivoting axis of the actuating arm and/or has a stronger curvature than that region of the first setting contour which comes into contact with the pressure portion upon a movement of the actuating arm.

The arrangement according to the invention includes a furniture drive of the described type and a supporting structure for mounting the furniture drive to a furniture carcass. Thereby, the supporting structure includes a first carrier member to be fixed to the furniture carcass and a first carrier rail displaceable, preferably vertically in the mounting position, relative to the first carrier member, and the furniture drive is supported on the first carrier rail. Thereby, the switch of the switching device is arranged on the first carrier member.

BRIEF DESCRIPTION OF THE DRAWINGS

Further details and advantages of the present invention will be explained with the aid of the following description of figures, in which:

FIG. 8a-8c show the furniture drive in a first height position relative to the furniture carcass and two enlarged detail views thereof, FIG. 9a-9c show the furniture drive in a second, lowered height position relative to the furniture carcass and two enlarged detail views thereof.

DETAILED DESCRIPTION OF THE INVENTION

Figure 1A:
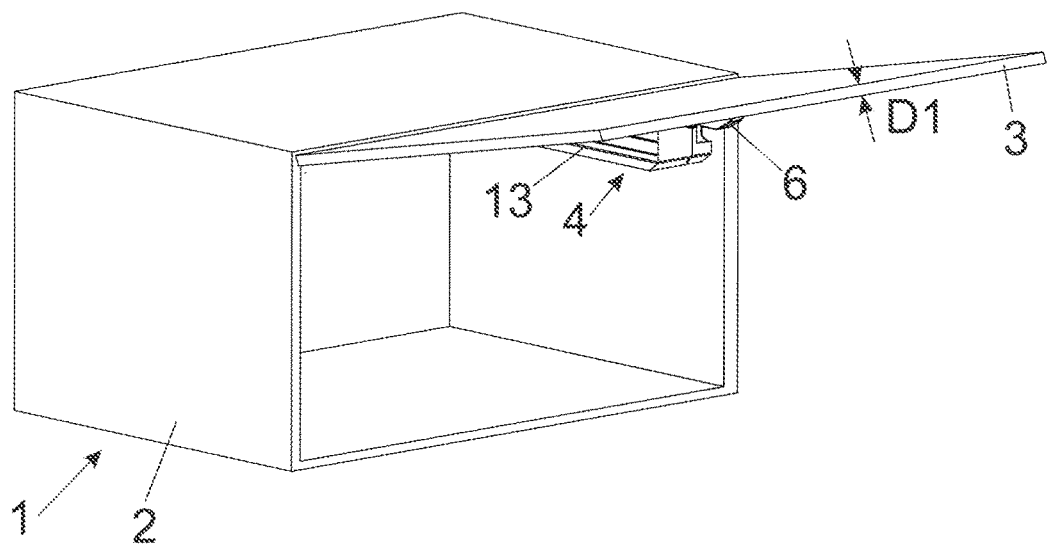
FIG. 1a, 1b show two items of furniture and a furniture drive for moving a movable furniture part in perspective views, in which the movable furniture parts have a different weight.
Figure 1B:
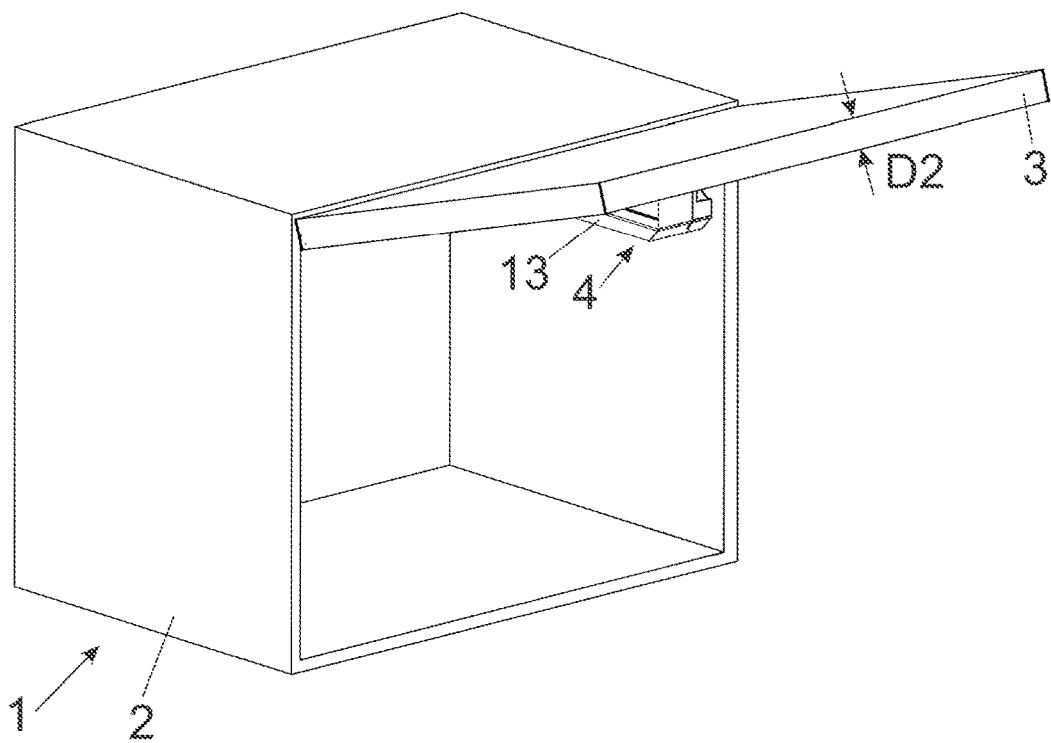

FIG. 1a and FIG. 1b each show an item of furniture 1 with a furniture carcass 2, in which furniture parts 3 can be moved relative to the furniture carcass 2 by a furniture drive 4. Each furniture drive 4 includes a housing 13 to be fixed to the furniture carcass 2 and an actuating arm 6 pivotable relative to the housing 13, so that the movable furniture parts 3, in each case, can be moved relative to the furniture carcass 2 from a vertical closed position into an elevated position. The furniture part 3 shown in FIG. 1b has a greater surface and/or has a greater material thickness D2 and/or is formed by a heavier material than the furniture part 3 shown in FIG. 1a, so that the furniture part 3 shown in FIG. 1b has a higher overall weight than the furniture part 3 shown in FIG. 1a having the smaller material thickness D1. Because of the different weight and/or the different loading conditions of the movable furniture parts 3, it is necessary that a corresponding torque is applied to the pivotable actuating arm 6 by the one and same furniture drive 4. By a switching device 9 (not shown here) of the furniture drive 4, depending on the weight and/or the loading condition of the movable furniture part 3, at least two setting contours 24, 27 (FIG. 4) with torque progressions deviating from one another can be, preferably automatically, switched. For example, by this switching, an initial coarse adjustment of the torque acting on the actuating arm 6 can be provided, whereupon by a (conventionally provided) adjustment device of the furniture drive 4, a fine adjustment of the torque acting on the actuating arm 6 can be made.

Figure 2A:
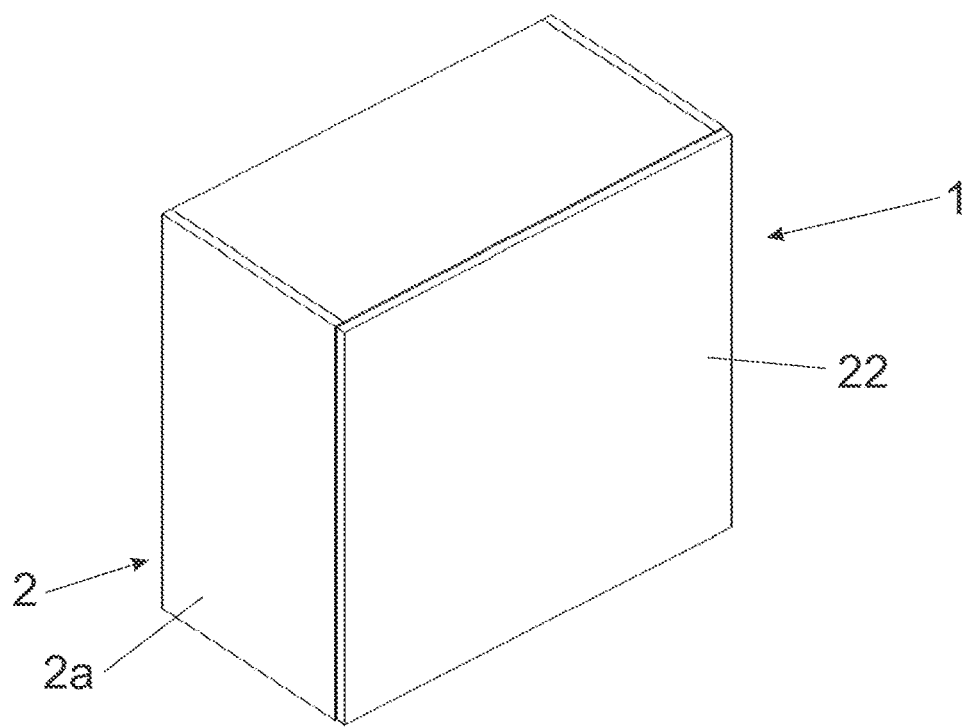
FIG. 2a, 2b show a further application field of the furniture drive by which a furniture part can be moved in height direction relative to the furniture carcass between an elevated closed position and a lowered open position.
Figure 2B:
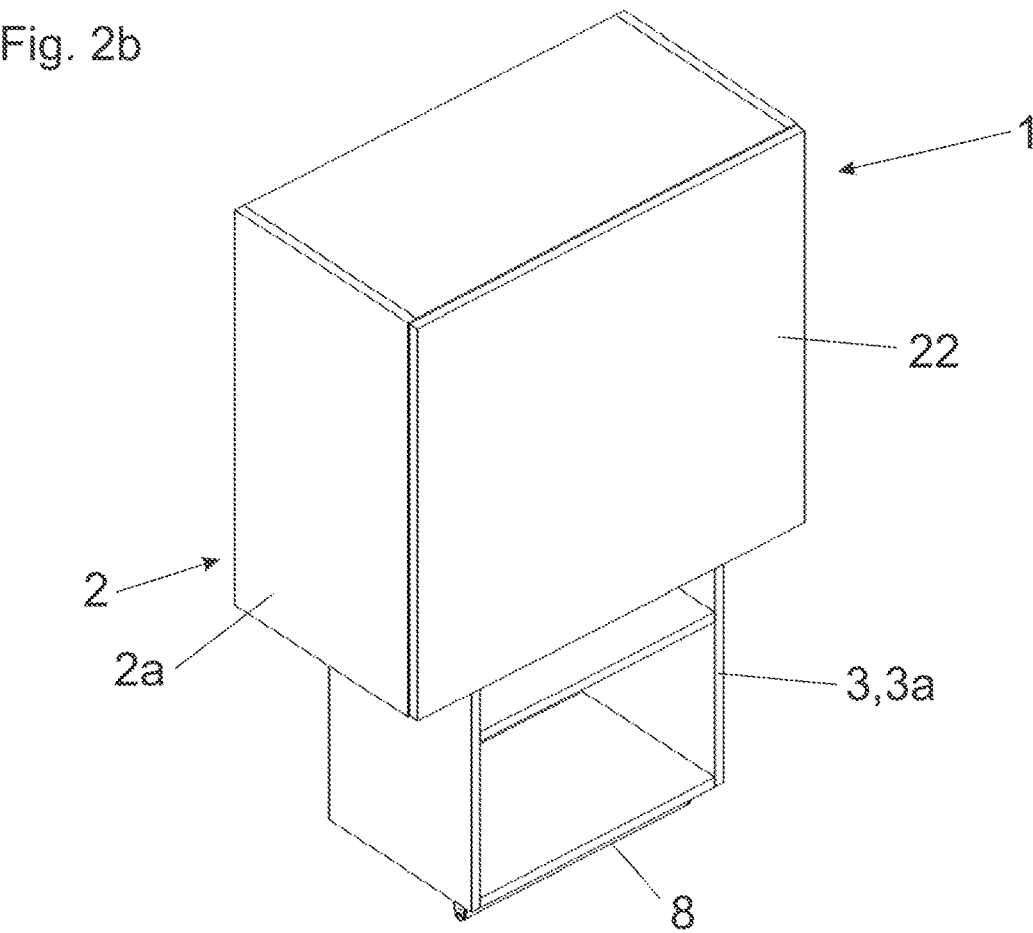

FIG. 2a and FIG. 2b show a further application field of the furniture drive 4. In the shown embodiment, the item of furniture 1 includes a furniture carcass 2 with an outer carcass 2a, and the outer carcass 2a is covered by a panel 22. By the furniture drive 4 (not shown here), a movable furniture part 3 in the form of an inner carcass 3a can be moved in a height direction relative to the outer carcass 2a between an elevated closed position and a lowered open position. The inner carcass 3a is configured so as to accommodate storage goods and can be lifted and lowered in a vertical direction relative to the outer carcass 2a by a handle 8.

Figure 3:
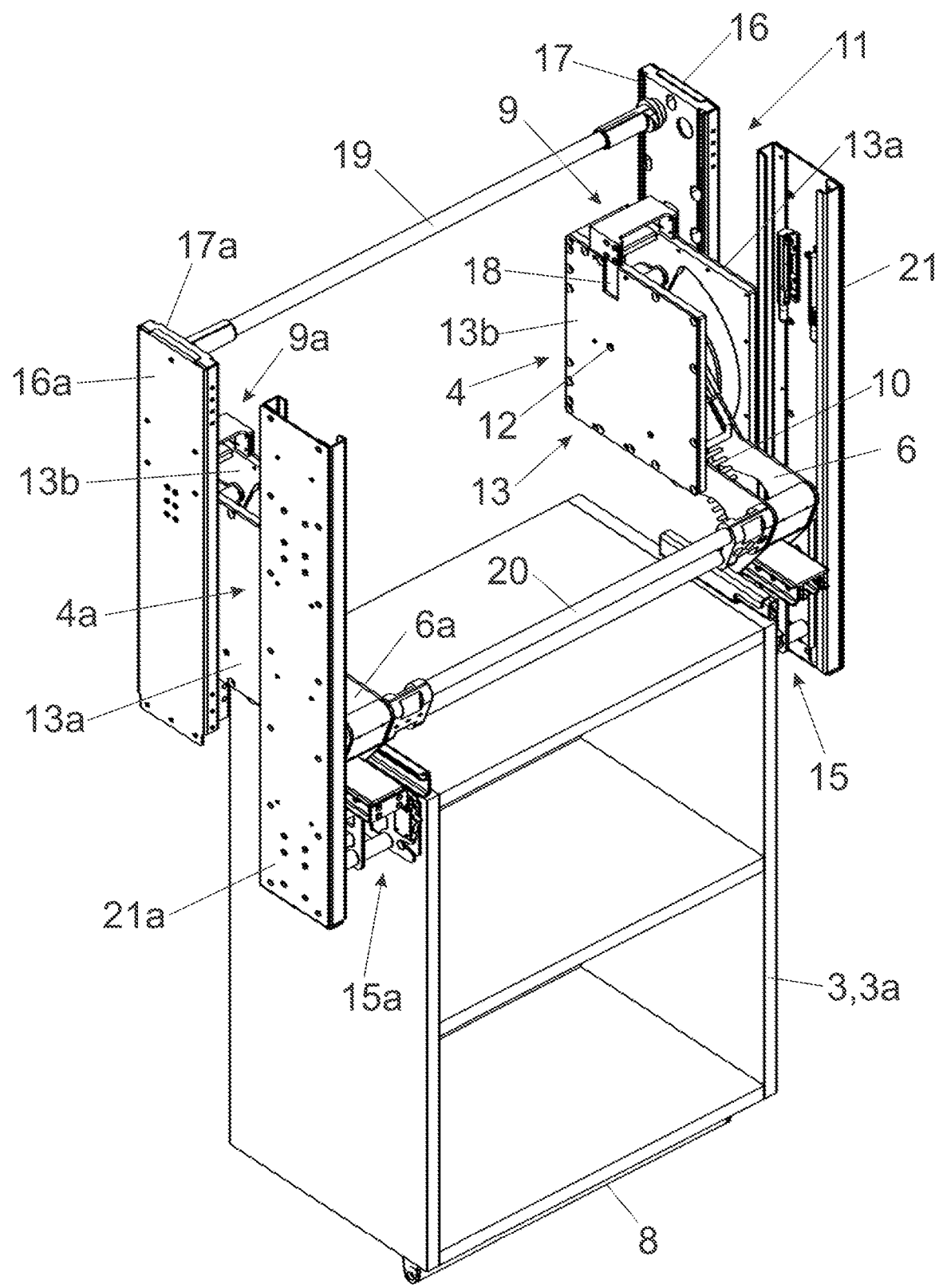
FIG. 3 shows the furniture drive with a supporting structure for fastening to a furniture carcass.

FIG. 3 shows the item of furniture 1 according to FIG. 2a, in which the outer carcass 2a and the panel 22 covering the outer carcass 2a are not depicted. The furniture drive 4 has a housing 13 with two housing portions 13a and 13b extending parallel to one another, between which an actuating arm 6 is pivotally mounted about a pivoting axis 12. The actuating arm 6 is being pressurized by a spring device 10 (preferably with at least one helical spring configured as a compression spring). The furniture drive 4 with the housing portions 13a, 13b is fixed to a carrier rail 17 which is movable relative to a carrier member 16 in a height direction to a limited extent by spring elements 38 (FIG. 8c, FIG. 9c), and the carrier member 16 is to be fixed to the outer carcass 2a. By a switching device 9 which, in the shown embodiment, includes at least one switch 18 connected to the carrier member 16, the furniture drive 4 can be switched into an operating mode having a different torque progression when the movable furniture part 3 exceeds a predetermined weight and/or loading condition. The pivotally mounted actuating arm 6 includes a fastening device 15 for mounting to the inner carcass 3a, and the inner carcass 3a can be displaced in a vertically extending direction along a linear guide 21 to be fixed to the outer carcass 2a.

On an opposing side wall of the outer carcass 2a, a second furniture drive 4a is arranged which is configured so as to be identical with the first furniture drive 4. The supporting structure 11 provided for attaching the second furniture drive 4a is also formed so as to be identical. Components 13, 14, 15, and so forth, of the first furniture drive 4 and the supporting structure 11, respectively, correspond to components 13a, 14a, 15a, and so forth, of the second furniture drive 4a and the supporting structure 11, respectively. A pivotal movement of the actuating arm 6 of the first furniture drive 4 can be synchronized by a second synchronization rod 20 with a pivotal movement of the actuating arm 6a of the second furniture drive 4a. The supporting structure 11 further includes a second carrier member 16a to be fixed to the outer carcass 2a and a second carrier rail 17a displaceable relative to the second carrier member 16a, and the second furniture drive 4a is supported on the displaceable second carrier rail 17a. A vertical movement of the first furniture drive 4 relative to the first carrier member 16 can be synchronized with a vertical movement of the second furniture drive 4a relative to the second carrier member 16a.

Figure 4:
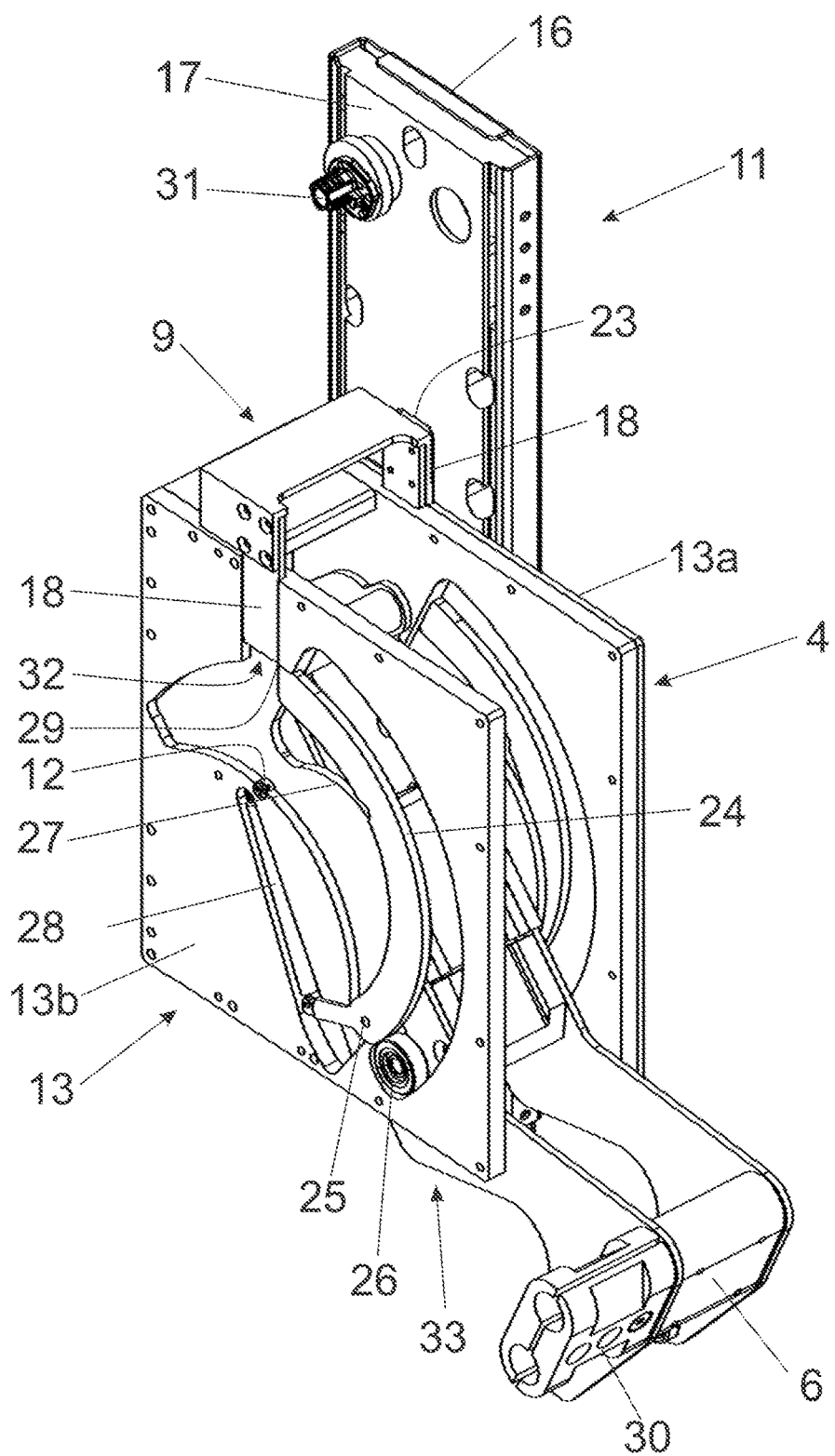
FIG. 4 shows the furniture drive in a perspective view in which the first setting contour is locked by the switching device, so that the pressure portion is configured to run along the first setting contour upon a movement of the actuating arm.

FIG. 4 shows the furniture drive 4 fixed to the carrier rail 17 in a perspective view. The carrier member 16 is to be fixed to a side wall of the outer carcass 2a, the carrier rail 17 is movable to a limited extent, together with the housing portions 13a, 13b of the furniture drive 4, in a height direction relative to the stationarily mounted carrier member 16. By a shaft 31, the respective height position of the furniture drive 4 relative to the carrier member 16 can be transmitted to the first synchronization rod 19 (FIG. 3). The carrier rail 17 includes a recess 23 for the passage of the switching device 9, so that each of the two switches 18 of the switching device 9 are connected to the outer carrier member 16 to be fixed to the outer carcass 2a. Accordingly, both switches 18 of the switching device 9, in the shown embodiment, are arranged stationarily relative to the outer carcass 2a. Each of the two switches 18 engage into guides 32 of their associated housing portions 13a, 13b and thereby lock an edge 29 of the first setting contour 24 having a first predetermined torque progression. For transmitting a force from the spring device 10, shown in FIG. 3, to the actuating arm 6 which is pivotally mounted about the pivoting axis 12, a transmission mechanism 33 is provided which includes the first setting contour 24 having a first torque progression and a pressure portion 26 pressurized by the spring device 10, and the pressure portion 26 is configured to run along the first setting contour 24 upon a movement of the actuating arm 6. In the shown embodiment, the pressure portion 26 is in the form of a rotatably mounted pressure roller configured to roll along the first setting contour 24 upon a movement of the actuating arm 6. The first setting contour 24 is pivotally mounted about a pivoting axis 25 and is acted upon by a return spring 28 in the form of a tension spring having a relatively small spring force. Therefore, after the first setting contour 24 has been unlocked (i.e. after the edge 29 of the first setting contour 24 has been decoupled from the switch 18), the first setting contour 24 can be again pushed in a direction of the locking position. In the shown figure, the actuating arm 6 is located in a pivoting position which corresponds to the lowered position of the movable furniture part 3 (inner carcass 3a), and the pressure portion 26, upon an upward pivoting movement of the actuating arm 6, can run along the first setting contour 24. The actuating arm 6 has an adaptor 30 for fastening the second synchronization rod 20 by which a pivoting movement of the actuating arm 6 can be synchronized with a pivoting movement of the opposing actuating arm 6a of the second furniture drive 4a (FIG. 3). Below a predetermined weight and/or below a predetermined loading condition of the movable furniture part 3 (inner carcass 3a), the pressure portion 26 is configured to be displaced along the first setting contour 24 upon a movement of the actuating arm 6.

Figure 5:
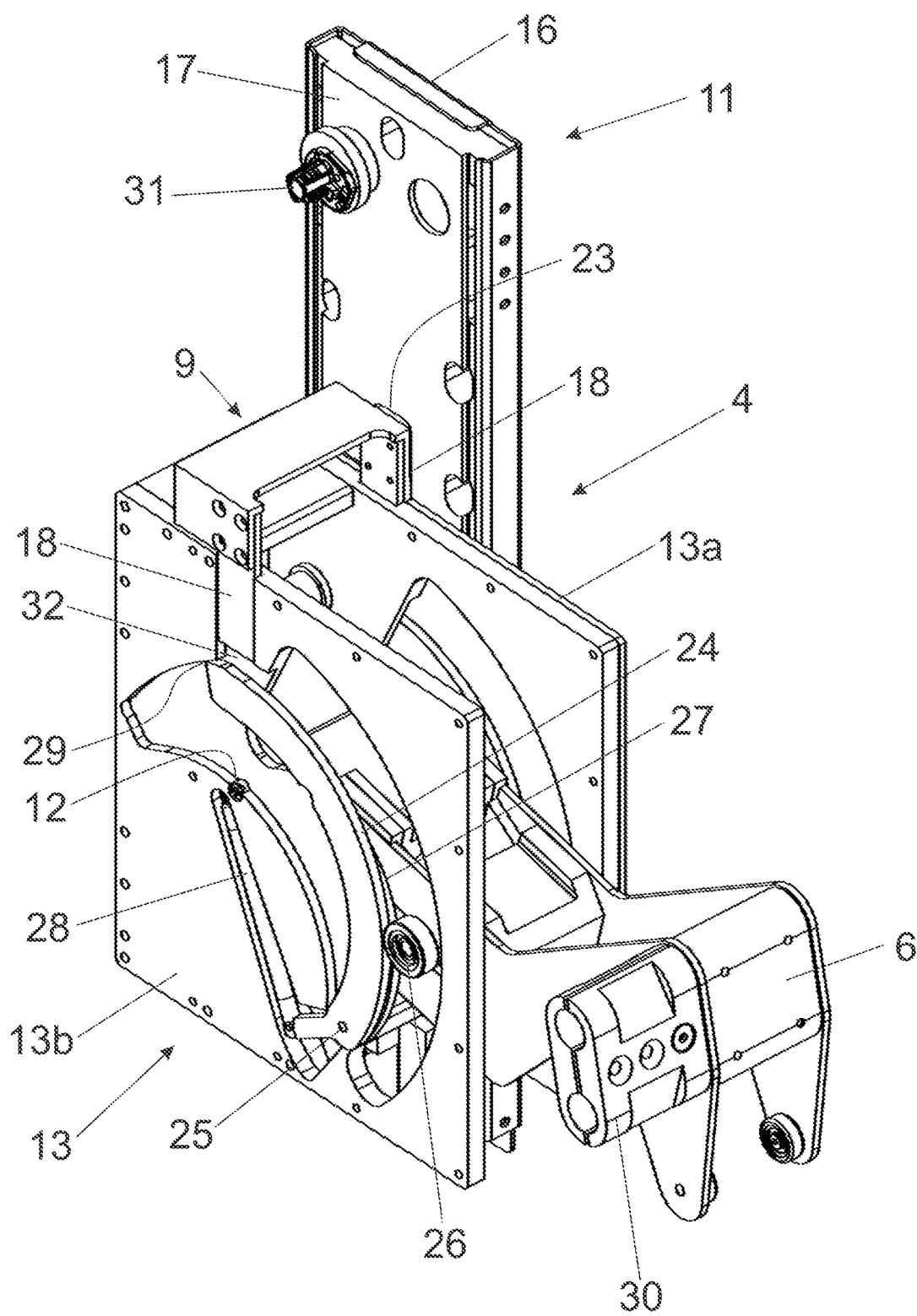
FIG. 5 shows the furniture drive in a perspective view in which the first setting contour is unlocked by the switching device, so that the pressure portion is configured to run along the second setting contour upon a movement of the actuating arm
Figure 6:
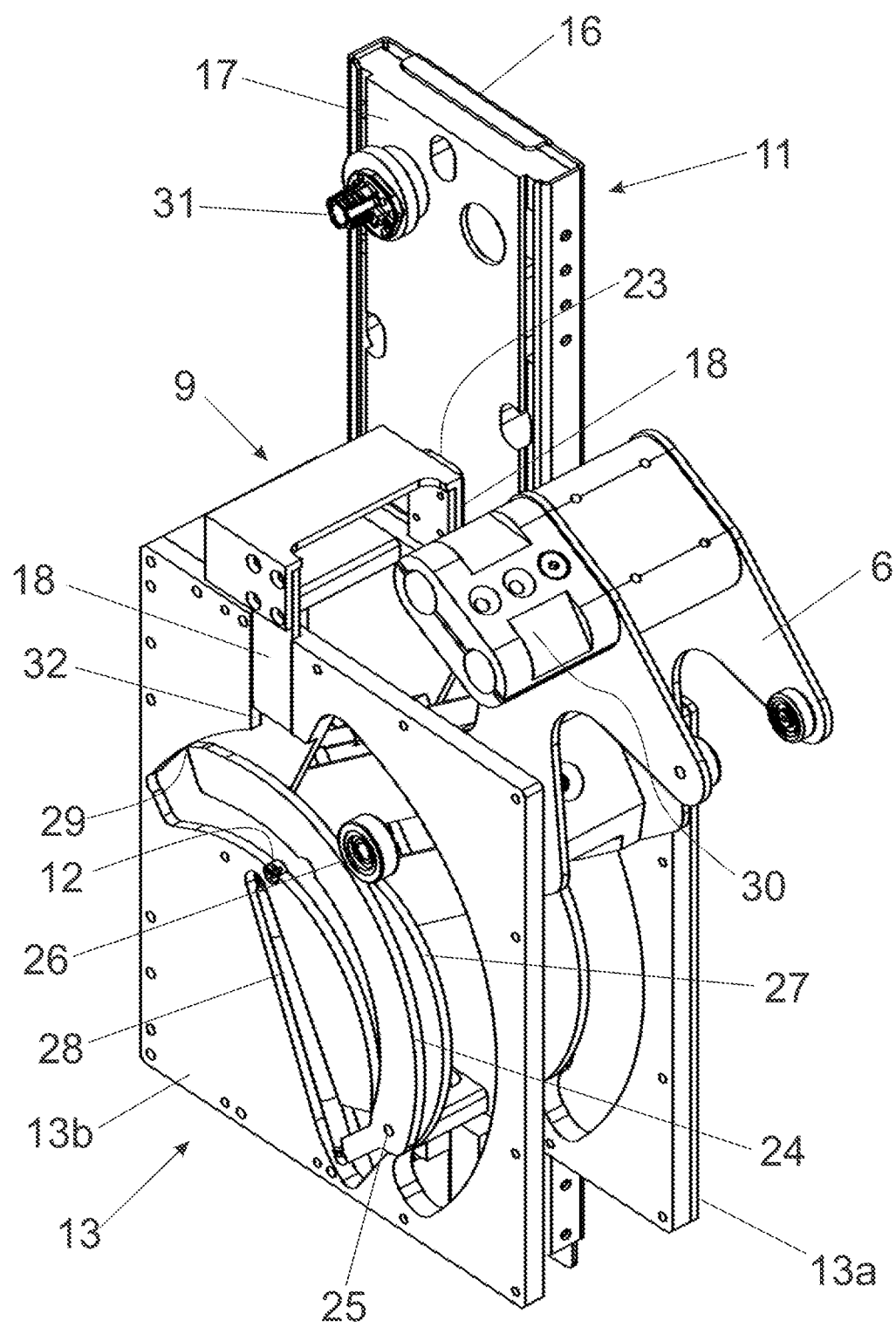
FIG. 6 shows the furniture drive according to FIG. 5 with a continued movement of the pressure portion along the second setting contour.

FIG. 5 shows the furniture drive 4 which has been lowered relative to the stationary carrier member 16 by an additional load of the inner carcass 3a. Each of the housing portions 13a, 13b are provided with guides 32 in which the switches 18 of the switching device 9 engage and thereby enable a vertical movement between the switches 18 and the housing 13 of the furniture drive 4. By lowering the furniture drive 4 relative to the carrier member 16, the edge 29 of the first setting contour 24 can be decoupled from the switches 18, and the first setting contour 24 is pressed away in a counterclockwise direction by the pressure portion 26 pressurized by the spring device 10 (FIG. 6). The pressure portion 26 can now be engaged with a second setting contour 27 having a torque progression deviating from the first setting contour 24. While the first setting contour 24 is movable relative to the pivoting axis 12 of the actuating arm 6, preferably movable about the pivoting axis 25, the second setting contour 27 is configured so as to be stationary relative to the pivoting axis 12 of the actuating arm 6. Preferably, the second setting contour 27, together with the housing portions 13, 13a of the furniture drive 4, has a one-piece configuration.

Figure 7:
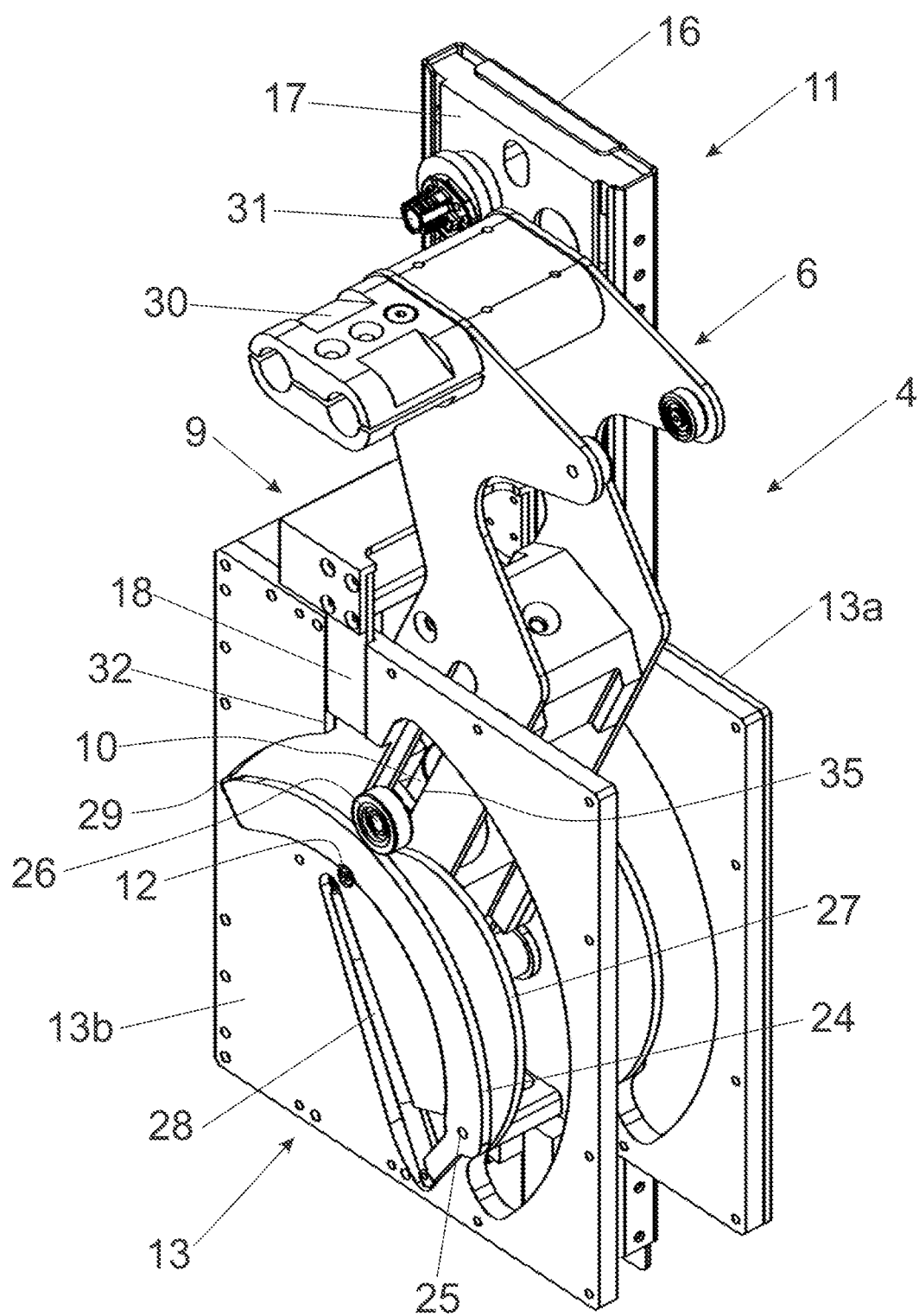
FIG. 7 shows the furniture drive with a further pivoting position of the actuating arm.

FIG. 7 shows the furniture drive 4 with the actuating arm 6 in an upper end position corresponding to the closed position of the inner carcass 3a relative to the outer carcass 2a. Accordingly, the pressure portion 26 has been displaced starting from the position shown in FIG. 5 along the second setting contour 27. The actuating arm 6 has an elongated hole 35 along which the pressure portion 26 pressurized by the spring device 10 can be displaced to a limited extent.

FIG. 8a shows the two opposing furniture drives 4 and 4a configured to be fixed to a furniture carcass 2 (FIG. 2b) by the supporting structure 11. The cover has been removed from the left (second) carrier rail 17a, so that a gear 36 arranged on a second end portion of the first synchronization rod 19 is visible. Arranged on the first end portion of the first synchronization rod 19 is a first gear 36 (not shown here), and the first gear 36 and the second gear 36 are each non-rotatably connected to the first synchronization rod 19 and each cooperate with a tooth arrangement 37 of the carrier member 16a. In this way, the vertical movements of the carrier rails 17, 17a (and therewith a vertical movement of the furniture drives 4a, 4b) can be synchronized by the first synchronization rod 19. FIG. 8b shows the region encircled in FIG. 8a in an enlarged view, in which the first setting contour 24 is locked to the switch 18 of the switching device 9 by the edge 29, so that the pressure portion 26 can be displaced along the first setting contour 24 upon a movement of the actuating arm 6. FIG. 8c shows the region B encircled in FIG. 8a in an enlarged view, in which the carrier rail 17a is supported relative to the carrier member 16a by at least one spring element 38, so that the carrier rail 17a (and therewith the furniture drives 4, 4a) are supported movably in a height direction to a limited extent. The movable furniture part 3 adopts a first height position relative to the furniture carcass 2 (and therewith to the carrier members 16, 16a) when the movable furniture part 3 has a first weight and/or a first loading condition.

FIG. 9a shows the two furniture drives 4, 4a in a lowered position relative to the furniture carcass 2 in comparison with the position shown in FIG. 8a. When the movable furniture part 3 (inner carcass 3a) is loaded by storage goods 39 (in the present case symbolized by a pile of plates), the furniture drives 4, 4a connected to the carrier rails 17, 17a are lowered relative to the stationary carrier members 16, 16a against the force of the spring element 28 (which, in the present case, is formed by two or more compression springs switched in a parallel relationship) and, as a result, adopt a second, lowered height position relative to the furniture carcass 2. As can be seen from the detail view according to FIG. 9b, the first setting contour 24 is also decoupled from the switch 18 connected to the carrier 16 by this increased loading, so that the edge 29 of the first setting contour 24 is unlocked from the switch 18. The unlocked first setting contour 24 is pivoted about the pivoting axis 25 by the pressure portion 26 pressurized by the spring device 10 (FIG. 3), so that the pressure portion 26 can be displaced along the second setting contour 27. Thereby, it can be provided that the second setting contour 27 has an increased torque progression in comparison to the first setting contour 24, so that the movable furniture part 3, also with an additional load caused by the storage goods 39, can be displaced along the linear guide 21 in the elevated end position relative to the furniture carcass 2.

Figure 10A:
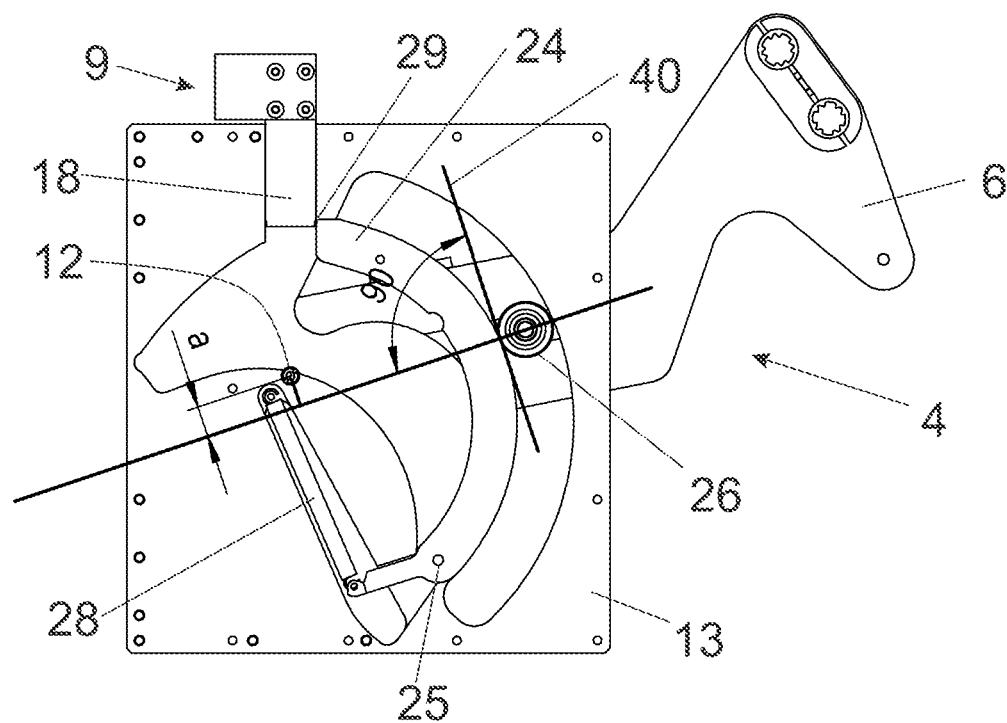
FIG. 10a, 10b show the furniture drive in a side view, in which the pressure portion is configured to run along the first setting contour on the one hand and on the second setting contour on the other hand.

FIG. 10a shows the furniture drive 4, in which the pressure portion 26 can be displaced along the first, convex-shaped setting contour 24 upon a movement of the actuating arm 6 about the pivoting axis 12. A perpendicular extending to a tangent 40 between the pressure portion 26 and the first setting contour 24 results in a first lever arm (a) in relation to the pivoting axis 12 of the actuating arm 6.

Figure 10B:
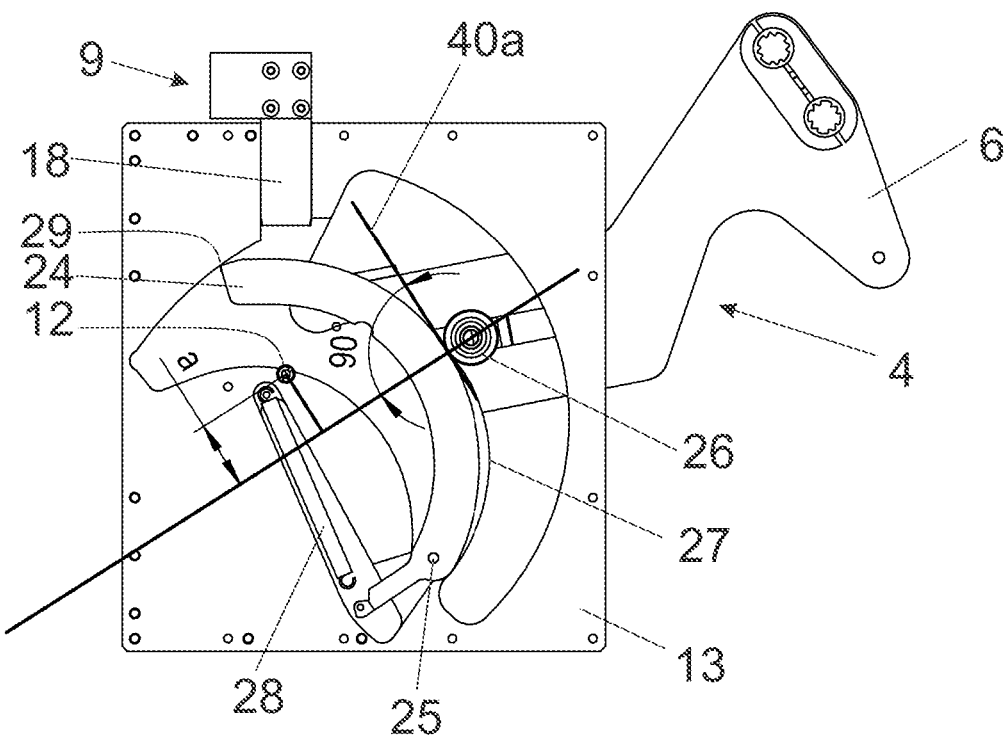

FIG. 10b, on the contrary, shows the first setting contour 24 decoupled from the switch 18, so that the pressure portion 26 can be displaced along the second, convex-shaped setting contour 27 upon a movement of the actuating arm 6 about the pivoting axis 12. A perpendicular extending to a tangent 40a between the pressure portion 26 and the second setting contour 27 results in a second lever arm (a) in relation to the pivoting axis 12 of the actuating arm 6. As can be seen from a direct comparison, the second lever arm (a) according to FIG. 10b is longer than the one shown in FIG. 10a. The respective torque results from the force multiplied by lever arm (formula $M=F*a$), so that when using the second setting contour 27 according to FIG. 10b having the longer lever arm (a), an increased torque progression is produced than when using the first setting contour 24 according to FIG. 10a.

The invention claimed is:

1. A furniture drive for moving a furniture part relative to a furniture carcass, the furniture drive comprising:
   a pivotally mounted actuating arm for moving the movable furniture part, the actuating arm being pivotable between a first end position and a second end position;
   a spring device for applying a force to the actuating arm; and
   a transmission mechanism for transmitting a force from the spring device to the actuating arm, the transmission mechanism including:
      a first setting contour having a first torque progression;
      a pressure portion pressurized by the spring device, the pressure portion being configured to run along the first setting contour upon a movement of the actuating arm an entire distance between the first end position and the second end position;
      a second setting contour separate and discrete from the first setting contour, the second setting contour having a second torque progression deviating from the first torque progression; and
      a switching device configured to engage the second setting contour with the pressure portion so that the pressure portion runs along the second setting contour upon a movement of the actuating arm the entire distance between the first end position and the second end position.

2. The furniture drive according to claim 1, wherein the first setting contour is pivotally mounted about a pivoting axis.

3. The furniture drive according to claim 1, wherein the second setting contour is configured so as to be stationary relative to a pivoting axis of the actuating arm.

4. The furniture drive according to claim 1, wherein the switching device is configured to be triggered manually and/or to be automatically triggered by a different weight and/or by a different loading condition of the movable furniture part.

5. An arrangement comprising the furniture drive according to claim 1 and a supporting structure for mounting the furniture drive to a furniture carcass.

6. A furniture drive for moving a furniture part relative to a furniture carcass, the furniture drive comprising:
   a pivotally mounted actuating arm for moving the movable furniture part;
   a spring device for applying a force to the actuating arm; and
   a transmission mechanism for transmitting a force from the spring device to the actuating arm, the transmission mechanism including:
      a first setting contour having a first torque progression;
      a pressure portion pressurized by the spring device, the pressure portion being configured to run along the first setting contour upon a movement of the actuating arm;
      a second setting contour having a second torque progression deviating from the first torque progression; and
      a switching device configured to engage the second setting contour with the pressure portion so that the pressure portion runs along the second setting contour upon a movement of the actuating arm, wherein the switching device includes a switch having a first position and a second position, wherein the first setting contour, in the first position of the switch, is locked, and in the second position of the switch, is unlocked.

7. The furniture drive according to claim 6, further comprising a return spring configured to pre-stress the first setting contour in a direction of the first position in which the first setting contour is to be locked to the switch.

8. A furniture drive for moving a furniture part relative to a furniture carcass, the furniture drive comprising:
   a pivotally mounted actuating arm for moving the movable furniture part;
   a spring device for applying a force to the actuating arm; and
   a transmission mechanism for transmitting a force from the spring device to the actuating arm, the transmission mechanism including:
      a first setting contour having a first torque progression;
      a pressure portion pressurized by the spring device, the pressure portion being configured to run along the first setting contour upon a movement of the actuating arm;
      a second setting contour having a second torque progression deviating from the first torque progression; and
      a switching device configured to engage the second setting contour with the pressure portion so that the pressure portion runs along the second setting contour upon a movement of the actuating arm, and
   a spring element configured to movably support the furniture drive relative to the furniture carcass in a height direction so that the movable furniture part having a first weight and/or having a first loading condition adopts a first height position relative to the furniture carcass, and so that the movable furniture part having a second weight higher than the first weight and/or having a second loading condition higher than the first loading condition adopts a second height position relative to the furniture carcass, wherein the second height position is lowered with respect to the first height position.

9. The furniture drive according to claim 8, wherein the switching device is configured to be triggered in the second height position.

10. An arrangement comprising:
   a furniture drive for moving a furniture part relative to a furniture carcass, the furniture drive including:
      a pivotally mounted actuating arm for moving the movable furniture part;
      a spring device for applying a force to the actuating arm; and
      a transmission mechanism for transmitting a force from the spring device to the actuating arm, the transmission mechanism including:
         a first setting contour having a first torque progression;
         a pressure portion pressurized by the spring device, the pressure portion being configured to run along the first setting contour upon a movement of the actuating arm;
         a second setting contour having a second torque progression deviating from the first torque progression; and
         a switching device configured to engage the second setting contour with the pressure portion so that the pressure portion runs along the second setting contour upon a movement of the actuating arm; and a supporting structure for mounting the furniture drive to the furniture carcass, the supporting structure including a first carrier member to be fixed to the furniture carcass and a first carrier rail displaceable relative to the first carrier member, the furniture drive being supported on the first carrier rail.

11. The arrangement according to claim 10, wherein the switching device includes a switch arranged on the first carrier member.

12. The arrangement according to claim 10, wherein the furniture drive is a first furniture drive, the arrangement further comprising a second furniture drive, the supporting structure including a second carrier member to be fixed to the furniture carcass and a second carrier rail displaceable relative to the second carrier member, wherein the second furniture drive is supported on the second carrier rail.

13. The arrangement according to claim 12, wherein the second carrier rail is displaceable vertically in a mounting position relative to the second carrier member.

14. The arrangement according to claim 12, further comprising a first synchronization rod configured to synchronize a vertical movement of the first furniture drive relative to the first carrier member and a vertical movement of the second furniture drive relative to the second carrier member with one another.

15. The arrangement according to claim 14, wherein the first synchronization rod has a first end portion with a first gear and a second end portion with a second gear, each of the first gear and the second gear being connected to the first synchronization rod in a non-rotatable manner, wherein the first gear cooperates with a first tooth arrangement of the first carrier member and the second gear cooperates with a second tooth arrangement of the second carrier member.

16. The arrangement according to claim 14, further comprising a second synchronization rod configured to synchronize a pivotal movement of the actuating arm of the first furniture drive and a pivotal movement of the actuating arm of the second furniture drive with one another.

17. The arrangement according to claim 10, wherein the first carrier rail is displaceable vertically in a mounting position relative to the first carrier member.

* * * * *